US007350965B2

(12) United States Patent
Galeczka

(10) Patent No.: US 7,350,965 B2
(45) Date of Patent: Apr. 1, 2008

(54) INDUSTRIAL MIXER STAND

(76) Inventor: John Galeczka, 26512 Dineral, Mission Viejo, CA (US) 92691

( * ) Notice: Subject to any disclaimer, the term of this patent is extended or adjusted under 35 U.S.C. 154(b) by 392 days.

(21) Appl. No.: 11/043,297

(22) Filed: Jan. 25, 2005

(65) Prior Publication Data

US 2006/0164915 A1 Jul. 27, 2006

(51) Int. Cl.
*F16M 11/10* (2006.01)

(52) U.S. Cl. ........................ 366/331; 248/664; 248/667

(58) Field of Classification Search ................ 248/647, 248/664–667; 366/331, 285, 606
See application file for complete search history.

(56) References Cited

U.S. PATENT DOCUMENTS

RE15,051 E * 2/1921 Shelton ........................ 476/26
2,062,520 A * 12/1936 Mall ........................ 451/359
2,545,236 A * 3/1951 Lesniak ........................ 366/47
2,547,787 A * 4/1951 Siebring et al. .............. 366/26
2,673,059 A * 3/1954 Lustig ...................... 248/316.7
2,933,273 A * 4/1960 Koch ........................ 248/667
5,356,214 A * 10/1994 Styles ........................ 366/285
2005/0259511 A1* 11/2005 Orton ........................ 366/285

* cited by examiner

*Primary Examiner*—David Sorkin
(74) *Attorney, Agent, or Firm*—Steins & Associates, P.C.

(57) ABSTRACT

A Stand for Industrial Mixers is disclosed. The stand includes a tiltable cradle for securely holding a mixer while a worker conducts maintenance on it. The stand further has an integrated seat to accommodate the worker. Furthermore, the stand provides a convenient location to place a lubricating bottle for use in conducting maintenance on a mixer. The stand is provided with casters to make it rollable to enable it to be moved about easily. Finally, the stand provides locations for dispensing and storing tools and materials needed for maintenance on a mixer.

17 Claims, 6 Drawing Sheets

INDUSTRIAL MIXER STAND

BACKGROUND OF THE INVENTION

1. Field of the Invention

This invention relates generally to stands and fixtures and, more specifically, to an Industrial Mixer Stand.

2. Description of Related Art

Large-scale industrial mixers are used widely for high volume pumping of liquids and mixes. One particularly common application for these devices is in the sewage transport and treatment industry. A typical industrial mixer design is depicted in FIG. 1. FIG. 1 is a perspective view of a prior art industrial mixer 10. The mixer 10 has two main features: the motor module 12 and the propeller 14 extending therefrom. The motor module 12 is generally sealed to permit the entire mixer 10 to be submersed in whatever fluid is being pumped. The propeller 14 typically has a plurality of blades 15 emanating from a central hub 17. The motor contained within the sealed motor module 12 acts to cause the hub 17, and therefore the propeller 14 to rotate.

In order to generate additional thrust, many of these mixers is also fitted with a jet ring 16. The jet ring 16 is a housing for the blades 15 that reduces cavitation and thereby creates a more efficient thrust-generating environment for the propeller 14. The jet ring 16 does not rotate, and is attached to the housing of the motor module 12 with three or more ring brackets 18.

Of course, the manufacturers of these mixers 10 seek to make them as maintenance-free as possible. Unfortunately, no mechanical device can be completely maintenance-free. Furthermore, the substantial cost of these mixers 10 makes it cost-prohibitive to replace the mixer 10 regularly. As a result, the mixers 10 must be removed from service periodically for either preventative or restorative maintenance. Due to the large size of these mixers 10, handling them for the purpose of maintenance and repair can be very challenging, and even dangerous. Many times, two or more individuals must work together to complete the maintenance. What is needed then, is a stand configured to permit a single worker to safely perform maintenance on industrial mixers 10.

SUMMARY OF THE INVENTION

In light of the aforementioned problems associated with the prior devices and methods, it is an object of the present invention to provide a Stand for Industrial Mixers. The stand should include a tiltable cradle for securely holding a mixer while a worker conducts maintenance on it. The stand should further have an integrated seat to accommodate the worker. Furthermore, the stand should provide a convenient location to place a lubricating bottle for use in conducting maintenance on a mixer. Still further the stand should be rollable to enable it to be moved about easily. Finally, the stand should have locations for dispensing and storing tools and materials needed for maintenance on a mixer.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Stand for Industrial Mixers.

Figure 2:
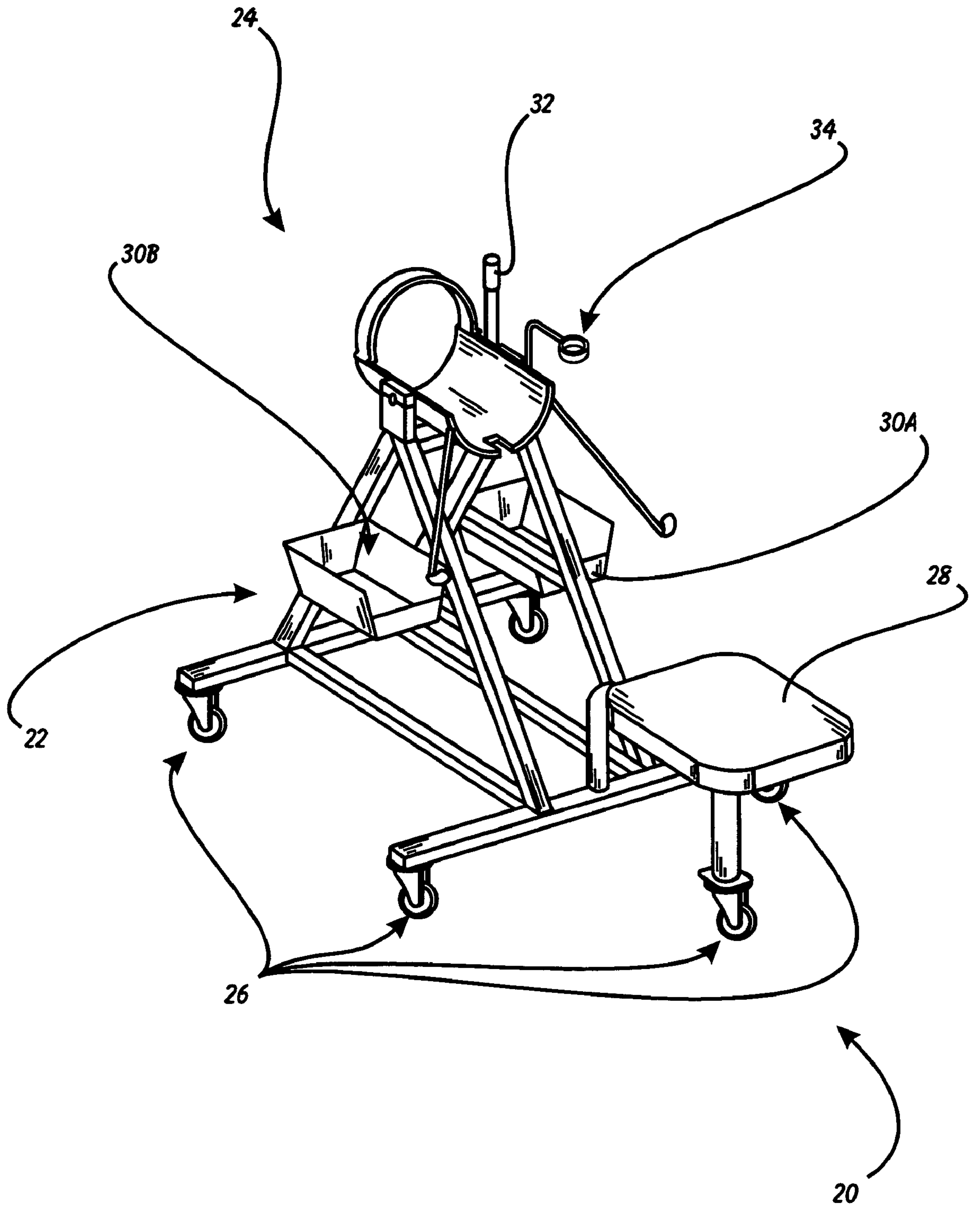
FIG. 2 is a perspective view of a preferred embodiment of an industrial mixer stand of the present invention.

The present invention can best be understood by initial consideration of FIG. 2. FIG. 2 is a perspective view of a preferred embodiment of an industrial mixer stand 20 of the present invention. The structural members of the stand 20 are made from durable material such as steel, typically provided with paint or some other protective coating to prevent corrosion and other damage.

The two main components of the stand 20 are the base frame assembly 22 and the cradle assembly 24 pivotally attached thereto. The base frame assembly 22 is preferably provided with casters 26 at several locations in order to provide easy mobility for the stand 20. The base frame assembly 22 further has a seat 28 provided thereon upon which the maintenance worker can remain comfortably seated while he or she performs maintenance upon the industrial mixer.

The base frame assembly 22 further may have a pair of trays 30A and 30B extending from it to provide a location for the worker to place the tools and equipment within handy reach when seated and doing maintenance on the mixer.

The cradle assembly 24 is designed to securely hold the mixer during maintenance, but still permit the maintenance worker to tilt the mixer via operation of the lever member 32 extending upwardly from the cradle assembly 24. The base frame assembly 22 may also be provided with an oil dispenser holster, which is a secure location for holding in inverted lubricating oil bottle (not shown) so the oil necessary for the maintenance operation can be gravity-fed out through a tube extending from the bottom of the inverted lubricating oil bottle (not shown). If we now turn to FIG. 3, we can continue to examine the impressive functionality of this device.

Figure 3:
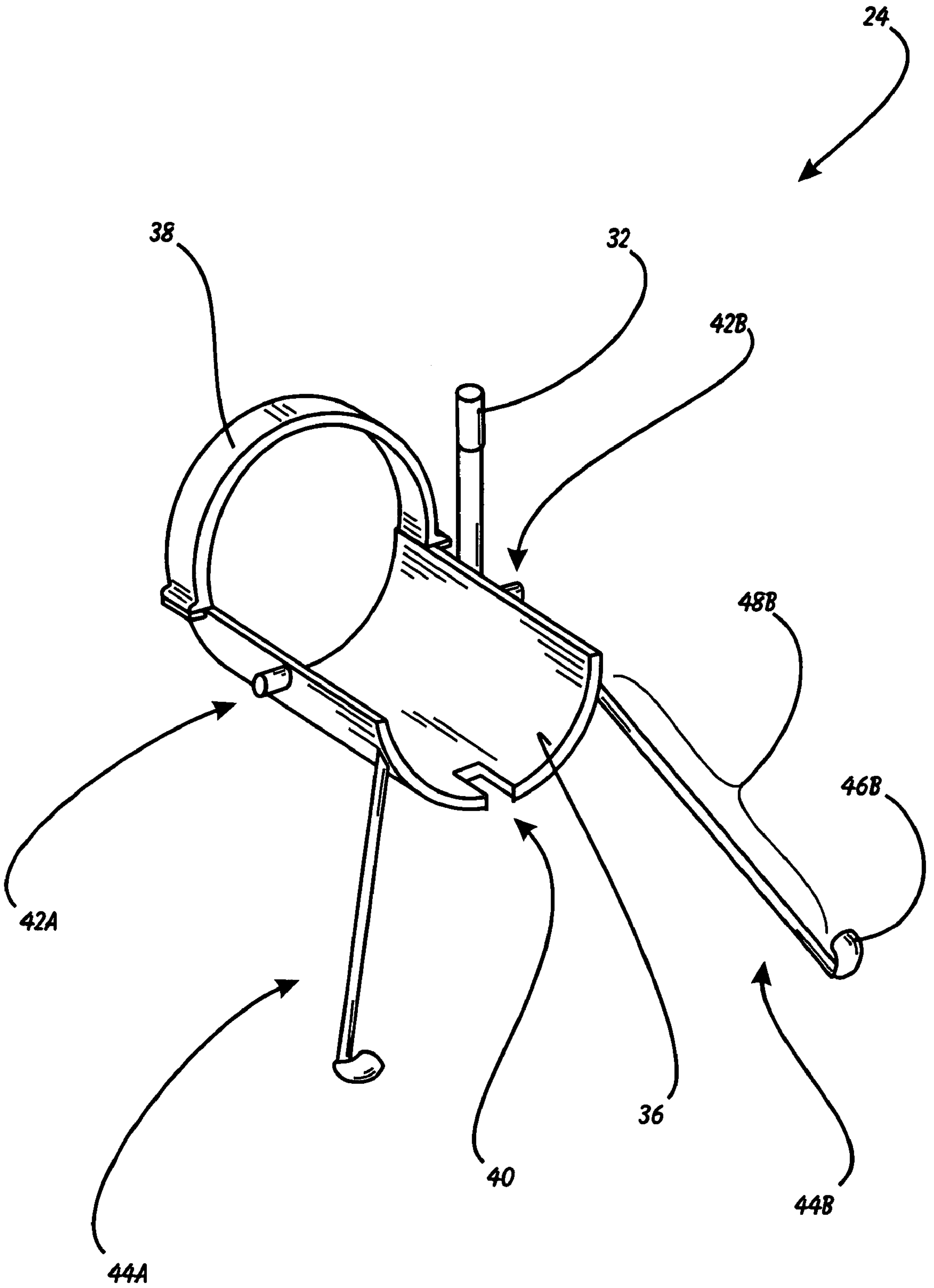
FIG. 3 is perspective view of the cradle assembly of the mixer stand of FIG. 2.

FIG. 3 is perspective view of the cradle assembly 24 of the mixer stand of FIG. 2. The cradle assembly 24 has a cradle member 36, which forms a curved, semi-cylindrical resting place for the mixer's motor module (see FIG. 1). A notch 40 may be cut into the front bottom edge of the cradle member 36. The notch 40, if included, is configured to accept one of the ring brackets (see FIG. 1) of the mixer therein (for those mixers including a jet ring and ring bracket (see FIG. 1).

A rear retaining member 38 is removably attachable to the rear end of the cradle member 36 to securely hold the motor module of the mixer to the cradle member 36. The rear retaining member 38 is likely to be attached to the cradle member 36 with conventional bolts or the like. First and second pivot axles 42A and 42B, respectively, extend outwardly from opposing sides of the cradle member 36. These axles 42 cooperate with corresponding axle clamps (see FIG. 4) to permit the cradle assembly 24 to be tilted up and down around the axis of the axles 42 to aid the maintenance worker in positioning the mixer for maintenance. A lever 32 is preferably provided to give the worker a convenient place to grasp when making adjustments in the tilt.

Another unique aspect of the cradle assembly 24 are the first and second front retaining members 44A and 44B, respectively. These retaining members are extend forwardly and downwardly from the vicinity of the front edge of the cradle member 36, and are each defined by an elongate arm (e.g. 48B) terminating in a hook (e.g. 46B) at their distal end. The retaining members 44 are provided to hook onto the lower, outer edge of the jet ring (see FIG. 1) in order to provide additional stability to the mixer being held and manipulated by the stand (see FIG. 2). All of the components of the cradle assembly 24 are preferably made from strong, durable and chemically-impervious materials, such as coated steel or the like. If we now turn to FIG. 4, we can continue to examine this very useful new device.

Figure 4:
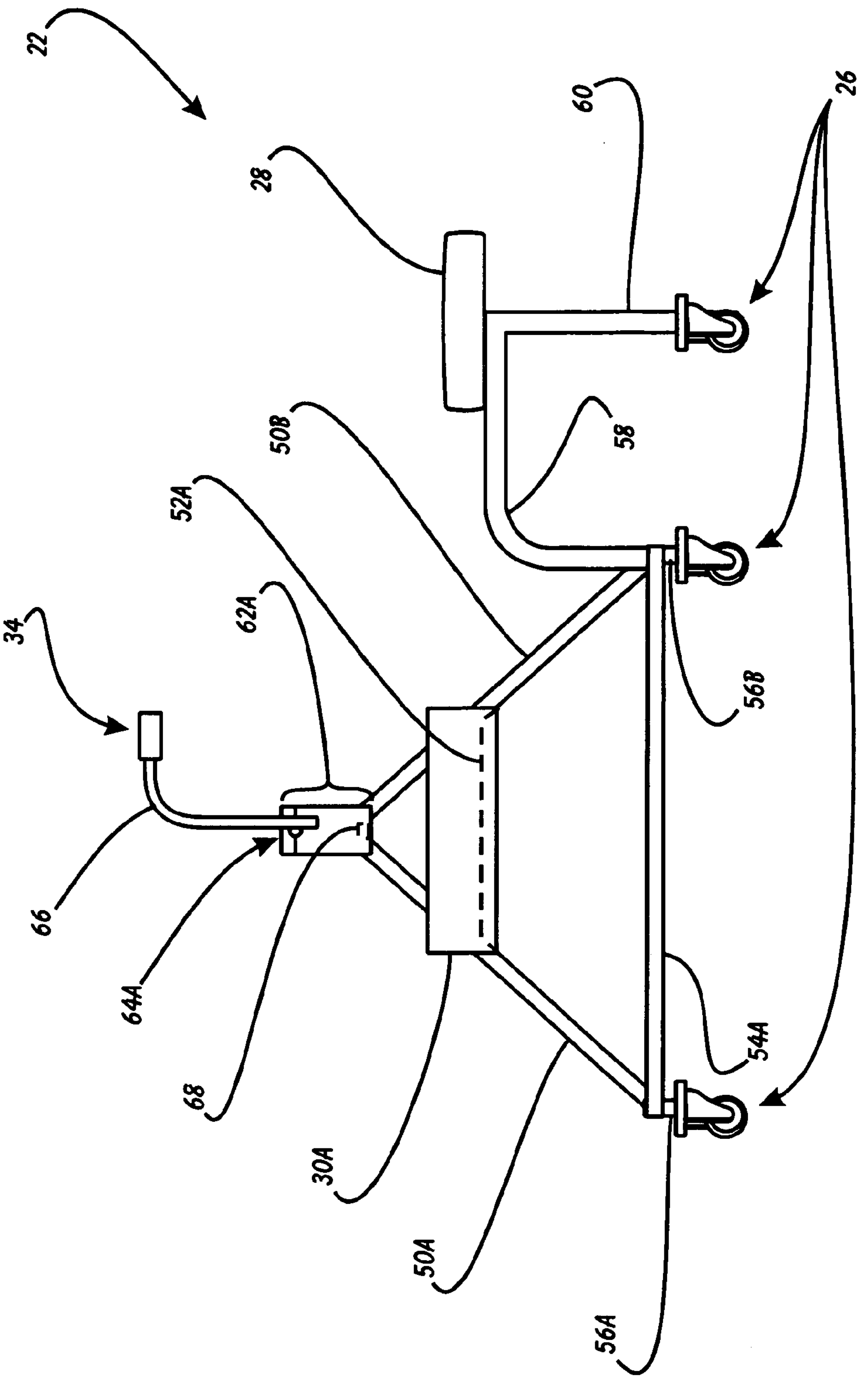
FIG. 4 is a side view of the base frame assembly of the mixer stand of FIG. 2.

FIG. 4 is a side view of the base frame assembly 22 of the mixer stand of FIG. 2. The assembly 22 is made up of a number of frame members interconnected to provide a stable, yet compact and portable unit. Since this is a side view, some of the frame members are hidden; coincident review of FIG. 2 while studying this FIG. 4 should make the element arrangement clear. First and second upright struts 50A and 50B, respectively extend upwardly and inwardly from first lower cross-member strut 54A until they interconnect at the first axle clamp 62A. The resultant triangular shape has been found to serve the needs of this device well, although other configurations may be possible.

A first upper cross-member strut 52A (shown here in hidden lines) is a further interconnection between the upright struts 50A and 50B that provides additional rigidity as well as a convenient mounting point for the first tray 30A. A pair of base struts 56A and 56B interconnect the aforementioned first triangular frame subassembly with its twin (second triangular frame subassembly). At each corner of the base frame assembly 22, a caster 26 is provided to aid in the portability of the stand.

The first axle clamp 62A has an oil dispenser holster 34 to provide a location where an inverted oil reservoir or dispenser may be placed in order to give the worker a ready gravity-fed source of critical lubricating oil for maintenance actions. The holster 34 is interconnected with the first axle clamp 62A by an arm 66 extending upwardly and forwardly therefrom. The axle clamp 62A is a two-piece assembly that bolts together to create an interference fit between the pivot bores (e.g. first pivot bore 64A) and the corresponding pivot axle (see FIG. 3) inserted therein. A transverse cross-member strut 68 is provided to give additional strength an stability to the assembly 22 (shown here in hidden lines behind the axle clamp 62A).

Figure 5:
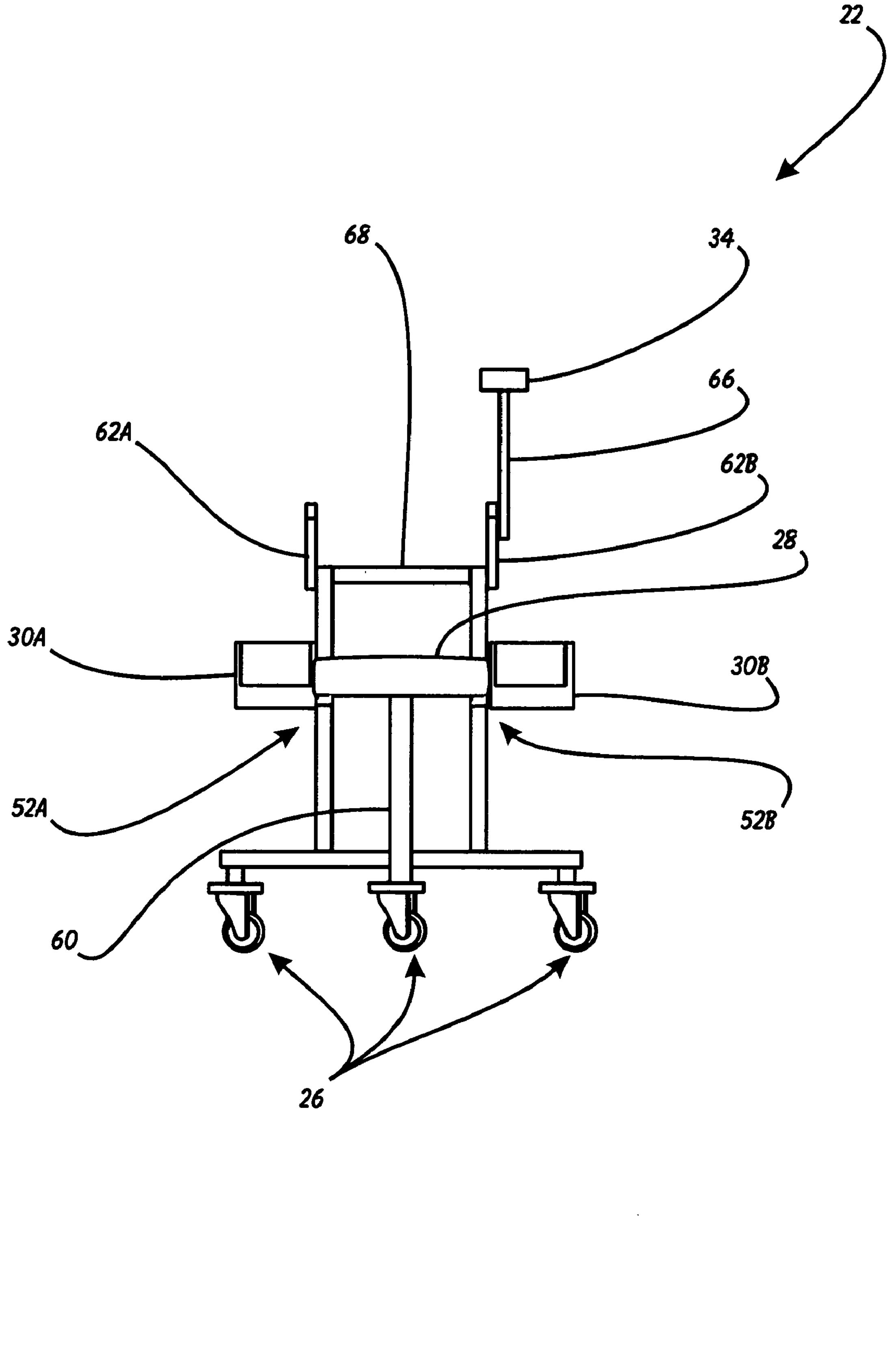
FIG. 5 is a front view of the base frame assembly of FIGS. 2 and 4.
Figure 6:
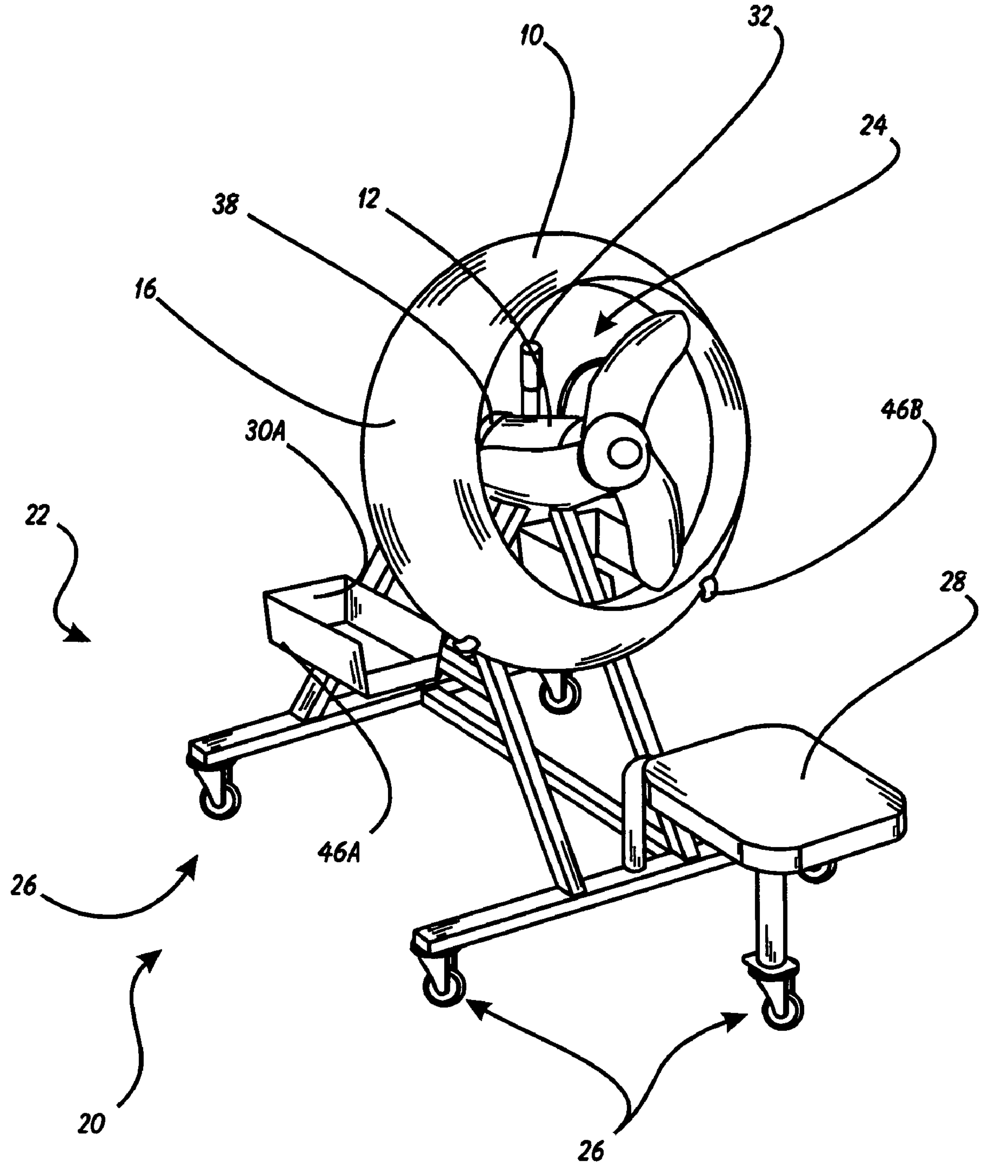
FIG. 6 is a perspective view of the mixer stand of FIG. 2 having a mixer of FIG. 1 mounted thereto, such as for maintenance.

The seat 28 is supported by a seat post 60 extending downwardly therefrom and terminating in a caster 26. The seat post 60 is attached to the second base strut 56B by a seat strut 58, such that the seat 28 travels with the base frame. FIG. 5 is provided to clarify any confusion related to the arrangement of elements of this device; it simply depicts a front view of the base frame assembly 22 so that hidden elements can be easily seen and understood. FIG. 6 shows the present invention in use.

Figure 1:
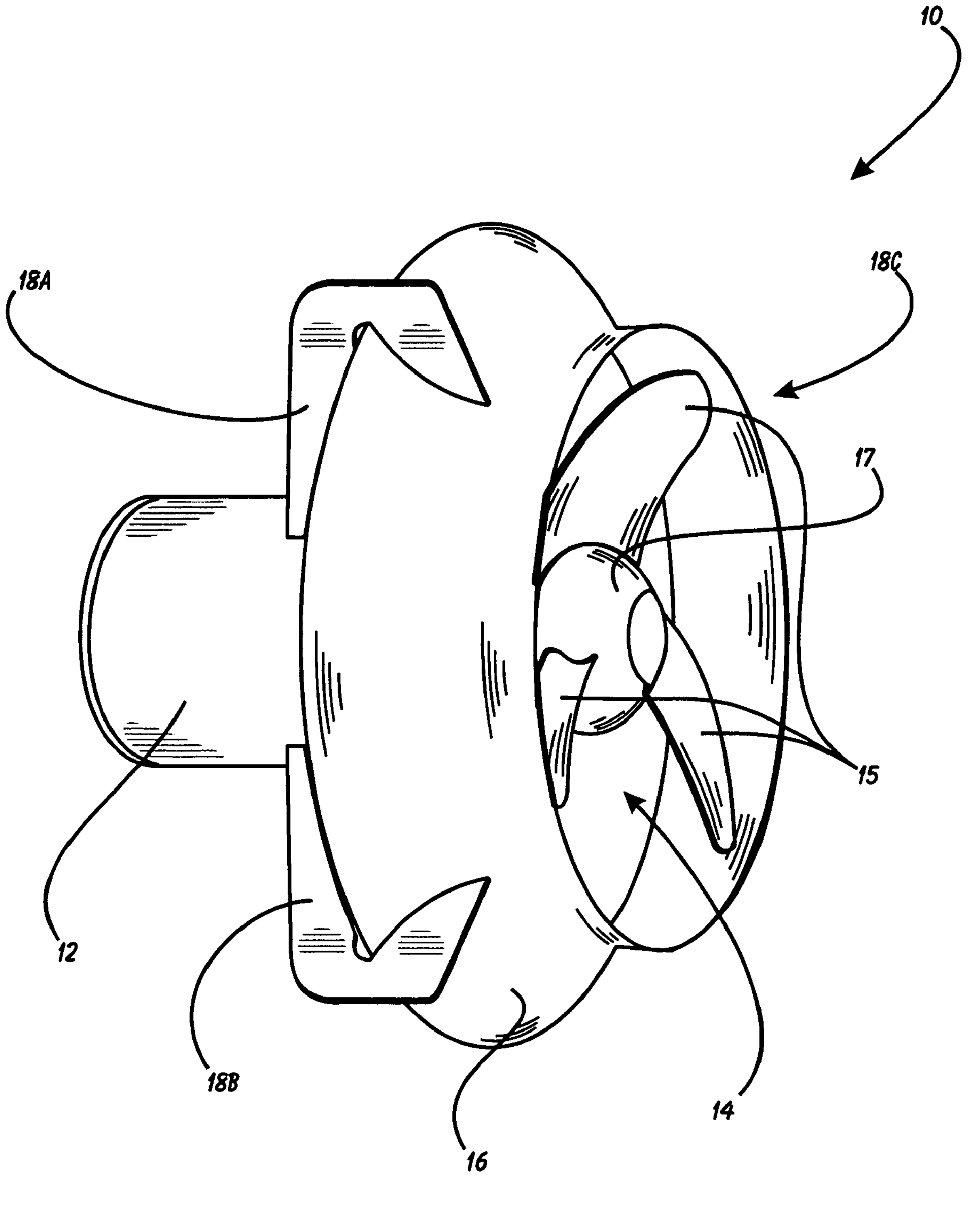
FIGURE 1 PRIOR ART
FIG. 1 is a perspective view of a conventional industrial mixer.

FIG. 6 is a perspective view of the mixer stand 20 of FIG. 2 having a mixer of FIG. 1 mounted thereto, such as for maintenance. As shown here, the motor module 12 of the mixer 10 is securely held to the cradle assembly by the rear retaining member 38. The hooks 46A and 46B (at the distal ends of their respective front retaining members) firmly engage the jet ring 16. The mixer 10, therefore, is well secured to the stand 20. If the user wishes to tilt the mixer 10, it is very simple to reach the lever 32 while seated upon the seat 28, without the need to get up. Furthermore, the trays 30A (and 30B which is not depicted here) are easily within arm's reach for a seated worker, such that tools and materials can be conveniently stored there for use during maintenance operations. The seat 28 is provided with a cushioned pad (preferably) in order to make it more ergonomically pleasing to the user.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A stand for industrial mixers, said mixers defined by a motor module and a propeller extending therefrom, said stand comprising:

a base frame assembly; and a cradle assembly pivotally attached to said base frame assembly, said cradle assembly designed to grasp an industrial mixer by its motor module, said cradle assembly comprising:

a cradle member defined by opposing upper edges, opposing front and rear end and a recessed central surface;

a retaining member for said grasping, said retaining member attached to said cradle member to bridge said opposing upper edges; and a seat attached to said base frame assembly by a seat strut extending therebetween.

2. The stand of claim 1, wherein said cradle member is substantially semi-cylindrically shaped defined by said opposing upper edges and said opposing front and rear ends and an inner concave surface and an outer convex surface.

3. The stand of claim 2, wherein said cradle assembly retaining member is attached to bridge said opposing upper edges adjacent to said rear end of said cradle member.

4. The stand of claim 3, wherein said cradle assembly further comprises a lever member extending generally upwardly therefrom.

5. The stand of claim 4, further comprising at least one front retaining member extending from said cradle member, each said front retaining member comprising an elongate arm defining a first end attached to said cradle member adjacent to said front end and a distal end, each said front retaining member further comprising a hook extending from said distal end.

6. The stand of claim 5, wherein said cradle member defines a longitudinal axis, said cradle assembly further comprising first and second pivot axles said pivot axles oriented along a pivot axis, said pivot axis being perpendicular to said cradle member longitudinal axis.

7. The stand of claim 6, wherein said base frame assembly comprises:

first and second base struts in parallel spaced relation and oriented in a transverse direction;

first, second, third and fourth upright struts, each said upright strut defining a bottom end and a top end, said bottom ends of said first and third upright struts interconnected to said first base strut, said bottom ends of said second and fourth upright struts interconnected to said second base strut; and said top ends of said first and second upright struts interconnected to a first axle clamp and said top ends of said third and fourth upright struts interconnected to a second axle clamp.

8. The stand of claim 7, further comprising a first lower crossmember strut interconnecting said bottom ends of said first and second upright struts and a second lower crossmember strut interconnecting said bottom ends of said third and fourth upright struts.

9. The stand of claim 8, further comprising at least one tray receptacle extending from a pair of said upright struts.

10. The stand of claim 9, further comprising an arm extending upwardly from one of said axle clamps, said arm terminating in an oil dispenser holster.

11. A fixture to aid in the manipulation of industrial mixers, said mixers defined by a motor module, a propeller extending therefrom, and a jet ring encircling said propeller, said fixture comprising:

a base frame assembly, comprising:

first and second base struts in parallel spaced relation and oriented in a transverse direction;

first, second, third and fourth upright struts, each said upright strut defining a bottom end and a top end, said bottom ends of said first and third upright struts interconnected to said first base strut, said bottom ends of said second and fourth upright struts interconnected to said second base strut;

said top ends of said first and second upright struts interconnected to a first axle clamp and said top ends of said third and fourth upright struts interconnected to a second axle clamp; and a first lower crossmember strut interconnecting said bottom ends of said first and second upright struts and a second lower crossmember strut interconnecting said bottom ends of said third and fourth unright struts; and a cradle assembly pivotally attached to said base frame assembly, said cradle assembly designed to grasp an industrial mixer by its motor module, said cradle assembly comprising:

a cradle member defined by opposing upper edges, opposing front and rear end and a recessed central surface; and a retaining member for said grasping, said retaining member attached to said cradle member to bridge said opposing upper edges.

12. The fixture of claim 11, further comprising at least one tray receptacle extending from a pair of said upright struts.

13. The fixture of claim 12, further comprising an arm extending upwardly from one of said axle clamps, said arm terminating in an oil dispenser holster.

14. The fixture of claim 13, further comprising a seat attached to said base frame assembly by a seat strut extending therebetween.

15. The fixture of claim 14, wherein said cradle member is substantially semi-cylindrically shaped further defined by said opposing upper edges and said opposing front and rear ends and an inner concave surface and an outer convex surface, and wherein said cradle assembly further comprises a rear retaining member attached to bridge said opposing upper edges adjacent to said rear end of said cradle.

16. The fixture of claim 15, further comprising at least one front retaining member extending from said cradle member, each said front retaining member comprising an elongate arm defining a first end attached to said cradle member adjacent to said front end and a distal end, each said front retaining member further comprising a hook extending from said distal end.

17. The fixture of claim 16, wherein said cradle member defines a longitudinal axis, said cradle assembly further comprising first and second pivot axles said pivot axles oriented along a pivot axis, said pivot axis being perpendicular to said cradle member longitudinal axis, said pivot axles further oriented to cooperate with said pivot axle clamps such that said first and second pivot bores accept said first and second pivot axles therein, respectively.

* * * * *